United States Patent [19]
Bard et al.

[11] Patent Number: 5,404,001
[45] Date of Patent: Apr. 4, 1995

[54] FIBER OPTIC BARCODE READER

[76] Inventors: Simon Bard, 19 Pembrook Dr.; Joseph Katz, 12 Hallock Meadow Dr. S., both of Stony Brook, N.Y. 11790; Miklos Stern, 138-31 Jewel Ave., Flushing, N.Y. 11367; Yajun Li, 527 Race Pl., Oakdale, N.Y. 11769

[21] Appl. No.: 957,845

[22] Filed: Oct. 8, 1992

[51] Int. Cl.⁶ ............................................. G06K 7/10
[52] U.S. Cl. ............................... 235/462; 235/472; 235/467; 235/473; 235/439; 250/227.26
[58] Field of Search ............... 235/472, 467, 473, 470, 235/439, 462; 250/227.26

[56] References Cited

U.S. PATENT DOCUMENTS

| | | | |
|---|---|---|---|
| 3,449,587 | 6/1969 | Barnes | 250/227.26 |
| 3,508,814 | 4/1970 | Aas | 359/199 |
| 3,532,408 | 10/1970 | Dostal | 359/199 |
| 3,544,201 | 12/1970 | Fowler et al. | 359/224 |
| 3,610,891 | 10/1971 | Raciazek | 235/472 |
| 3,614,677 | 10/1971 | Wilfinger | 333/200 |
| 3,758,199 | 9/1973 | Thaxter | 359/224 |
| 3,794,410 | 2/1974 | Elliott | 359/224 |
| 3,902,783 | 9/1975 | Bodlaj | 359/221 |
| 3,978,318 | 8/1976 | Romeo et al. | 235/472 |
| 3,981,566 | 9/1976 | Frank et al. | 359/224 |
| 4,025,203 | 5/1977 | Lee | 359/224 |
| 4,170,397 | 10/1979 | Botcherby et al. | 359/210 |
| 4,251,798 | 2/1981 | Swartz et al. | 235/462 |
| 4,387,297 | 6/1983 | Swartz et al. | 235/462 |
| 4,409,470 | 10/1983 | Shepard et al. | 235/472 |
| 4,436,364 | 3/1984 | Lauer et al. | 359/214 |
| 4,577,131 | 3/1986 | Soobitsky | 310/328 |
| 4,645,915 | 2/1987 | Van Ruyven | 235/472 |
| 4,708,420 | 11/1987 | Liddiard | 359/199 |
| 4,775,815 | 10/1988 | Heinz | 310/328 |
| 4,778,233 | 10/1988 | Christenson et al. | 359/214 |
| 4,896,935 | 1/1990 | Lee | 385/22 |
| 4,923,281 | 4/1990 | Krichever et al. | 359/826 |
| 5,015,831 | 5/1991 | Eastman et al. | 235/472 |
| 5,028,769 | 7/1991 | Claypool et al. | 235/473 |
| 5,130,534 | 7/1992 | Gourirand | 250/227.26 |
| 5,144,120 | 9/1992 | Krichever et al. | 235/472 |
| 5,191,197 | 3/1993 | Metlitsky et al. | 235/472 |

FOREIGN PATENT DOCUMENTS 0264956 4/1988 European Pat. Off.
1387091 3/1975 United Kingdom .

*Primary Examiner*—Donald Hajec
*Assistant Examiner*—Esther Chin

[57] ABSTRACT

The laser diode of an optical scanning system is located in a separate unit and light therefrom carried to a remote scan head via an optical fiber. This reduces the size and weight as well as temperature sensitivity of the scan head. The separate unit may include an optical sensor for detecting light reflected from scanned symbols. If the separate unit houses the sensor, the same fiber or an additional fiber will collect the reflected light and transmit that light back to the sensor. An electromagnetic system produces a scanning motion of the beam emitted by the scan head where the optical fiber is attached to a magnet.

20 Claims, 6 Drawing Sheets

FIBER OPTIC BARCODE READER

TECHNICAL FIELD

The present invention relates to optical scanners for optically reading information, such as bar codes. In particular, this invention relates to small light weight scanning structures using optical fibers.

BACKGROUND ART

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate.

A variety of scanning devices are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and are incorporated by reference herein—have generally been designed to read indicia having parts of different light reflectivity, e.g., bar code symbols, particularly of the Universal Product Code (UPC) type, at a certain working or reading distance from a hand-held or stationary scanner.

In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. An optical sensor or photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer, associated with or included in the scanner, processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination. Typically, the various decoder functions are performed by a microprocessor, with associated program memory and random access data memory.

FIG. 7 illustrates an example of a prior art bar code reader unit 10 implemented as a gun shaped device, having a pistol-grip type of handle 53. A lightweight plastic housing 55 contains the laser light source 46, the detector 58, the optics and signal processing circuitry and the CPU 40, as well as a power source or battery 62. A light-transmissive window 56 in the front end of the housing 55 allows the outgoing light beam 51 to exit and the incoming reflected light 52 to enter. The reader 10 is designed to be aimed at a bar code symbol 70 by the user from a position in which the reader 10 is spaced from the symbol, i.e., not touching the symbol or moving across the symbol.

As further depicted in FIG. 7, a suitable lens 57 (or multiple lens system) may be used to focus the scanned beam into a scanning spot at an appropriate reference plane. A light source 46, such as a semiconductor laser diode, introduces a light beam into the axis of the lens 57, and the beam passes through a partially-silvered mirror 47 and other lenses or beam-shaping structure as needed. The beam is reflected from an oscillating mirror 59 which is coupled to a scanning motor 60 energized when the trigger 54 is pulled. The oscillation of the mirror 59 causes the reflected beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

The light 52 reflected back by the symbol 70 passes back through the window 56 for application to the detector 58. In the exemplary reader 10 shown in FIG. 7, the reflected light reflects off of mirror 59 and partially-silvered mirror 47 and impacts on the light sensitive detector 58. The detector 58 produces an analog signal proportional to the intensity of the reflected light 52. This signal is processed and digitized by circuitry mounted on board 61 and decoded by microprocessor 40.

To scan a symbol 70, a user aims the bar code reader unit 10 and operates movable trigger switch 54 to activate the light beam 51, the scanning motor 60 and the detector circuitry. If the scanning beam is visible, the operator can see the scan pattern on the surface on which the symbol appears and adjust aiming of the reader 10 accordingly. If the light produced by the source 46 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

The reader 10 may also function as a portable computer terminal. If so, the bar code reader 10 would include a keyboard 48 and a display 49, such as described in the previously noted U.S. Pat. No. 4,409,470.

In optical scanners of the type discussed above, the laser diode, the lens, the mirror and the means to oscillate the mirror all add size and weight to the handheld scanner. The photodetector and the associated processing circuitry also add size and weight. In applications involving protracted use, a large heavy handheld unit can produce fatigue. When use of the scanner produces fatigue or is in some other way inconvenient, the user is reluctant to operate the scanner. Any reluctance to consistently use the scanner defeats the data gathering purposes for which bar code systems are intended.

Thus, an ongoing objective of barcode reader development is to miniaturize the barcode reader as much as possible. The laser diode is a bulky item and typically requires a heat sink. The laser diode is becoming smaller, but it still is a rather large component of the scanner. The degree of miniaturization of a barcode scanner, therefore, is limited by the size of the laser diode and the associated means to oscillate the laser beam.

Published European Patent Application No. 264,956 discloses an optical code reader using an optical fiber. Specifically, EP 264,956 teaches mounting a laser light source in a floor unit and supplying light therefrom to a handheld scanning head via an optical fiber. A photodiode in the scanning head detects light reflected from the scanned code and provides a corresponding electrical signal via a cable to a calculation unit within the floor unit. The calculation unit processes the electrical signal to produce an electrical representation of the scanned code. In one specific embodiment, the sleeve retaining the emitting end of the fiber and an associated lens are mounted on a pivotally supported platform. Reciprocal movement of the platform about the pivot axis produces a scanning motion of the beam. The presence of the photodiode in the scan head and the specific means used to produce the necessary scan motion of the beam still add excess size and weight to the system, and thereby make that system unsuitable for protracted use in many situations.

From the above discussion of the state of the art, it becomes clear that a need still exists to further reduce the size and weight of the scan unit and to provide a particularly convenient scanner system. The mass of the moving components should be as low as possible to minimize the power required to produce the scanning movement and to facilitate operation at high scanning speeds.

Disclosure of the Invention

Objectives

One objective of this invention is to provide an optical scanning head which is smaller and lighter weight, when held by an operator, and which is easier to manipulate to scan encoded data. Therefore, the scanning head should include as few components as is practical, and all components in the scan head should be as small and lightweight as possible.

To reduce weight and achieve a higher degree of miniaturization, it is a specific object of this invention to eliminate the laser diode, the mirror and the means oscillate the mirror to produce the scanning motion of the beam from the optical scan head manipulated by the operator.

Another objective is to eliminate the photodetector from the portion of the optical scanner system which is actually held and manipulated by the operator.

Summary

Because a laser diode is a bulky item and typically requires a heat sink, the present invention eliminates the laser diode from the actual scanner unit and places the diode in a separate box. The invention then uses one or more optical fibers to carry light from the diode to the scanner unit. To further reduce the size and weight of the scan head, the invention also moves the detector to the separate box. The invention also uses a number of different systems for producing the scanning motion of the beam, each of which are designed to be particularly small and light weight.

A further advantage provided by the invention is that the scan head can operate in a hostile environment. A laser diode is quite sensitive to temperature. Since the invention locates the laser diode in the separate housing, a fiber scan module can be introduced into a hostile environment without subjecting a sensitive diode to extreme temperatures.

In a first aspect, the invention is a system for reading optically encoded information including an optical scan unit, a separate unit and at least one optical fiber. The separate unit contains a light emitter, an optical detector and circuitry for analyzing signals from the optical detector. The optical fiber carries light from the emitter to the scan unit. The optical fiber also receives light reflected from scanned optically encoded information and carries the reflected light from the scan unit back to the optical detector within the separate unit. The optical reading system also includes means, within the scan head, for producing oscillatory movement of light from the emitter, as it emerges from the optical fiber, such that the light beam scans the optically encoded information.

The invention also encompasses a second system, for scanning optically encoded information. This second system includes an optical scan unit and a separate unit. The separate unit, in this system, contains a light emitter. An optical fiber connects between the optical scan unit and the separate unit. The optical fiber carries light from the emitter to the scan unit. Three different means within the optical scan unit may be used to produce oscillatory movement of light emerging from the free end of the optical fiber such that the resulting beam scans the optically encoded information.

In one embodiment of the scanning system, the means for producing oscillatory motion comprise a flexible support for mounting the end of the optical fiber within the scan unit, and a magnet fixed with respect to the first end of the optical fiber. An oscillating force is applied to the magnet, for example by the field produced by a coil driven by an AC current, to produce an oscillating motion of the free end of the optical fiber.

In another embodiment of the scanning system, the means for producing oscillatory motion comprise a piezoelectric element. The piezoelectric element is attached to the free end of the optical fiber within the scan head. In response to a drive signal, the piezoelectric element produces oscillatory movement of the end of the optical fiber for scanning the optically encoded information. In a further embodiment of the scanning system, the means for producing oscillatory motion comprise a lens, a flexible support for the lens and means for producing oscillatory movement of the lens to oscillate the light emerging from the first end of the fiber in a scanning pattern.

The three different embodiments of the scanning system each may include an optical detector. The detector may be mounted in the scan unit for sensing light reflected from the optically encoded information, and a flexible cable then carries a signal from the optical detector from the scan unit back to circuitry for analyzing signals within the separate unit. Alternatively, the detector may be mounted in the separate unit and a fiber carries reflected light from the scan unit back to the detector.

Thus, the present invention locates the laser diode and analog and digital signal processing electronics, the batteries and any RF communication circuitry which might be used all in a separate housing unit. This housing unit may be mounted on the wrist, on the arm, on the belt or on the helmet of the user. A fiber coupled to a visible laser diode (VLD) within the housing transmits the light to the scan head. The free end of the fiber where focusing optics (lenses) could be attached is oscillated either by an electromagnetic drive system or a piezoelectric motion device. Alternatively, the end of the fiber is fixed in the scan head, and the lens is separate from the end of the fiber. In such a case, a motion device moves the lens to produce the beam scanning pattern.

To detect the reflected light, the invention can use several different techniques. In one technique, a photosensor located in the scan head senses the reflected light and produces a sensing signal for transmission to the circuitry in the separate housing unit. The photosensor can be stationary or can move with the lens or fiber end.

In another specific embodiment, a second fiber or a set of additional fibers, pick up reflected light and carry it from the scan head to a photosensor in the separate housing unit. Additional optics, such as another lens may be used to collect the reflected light for transmission through the second fiber or set of additional fibers.

In a further specific embodiment the same fiber which carries light from the laser diode to the scan head can direct the reflected light from the scan head back to the sensor located inside the separate housing. This embodiment also uses a beam splitter inside the housing.

The invention significantly reduces the size of the scanner's beam transmitting and receiving part, thus allowing the construction of a miniature scan head both small in size, lightweight and amenable to operation in hostile environments. The scan heads provided by the present invention can be mounted, worn or held by an operator in a wide range of positions to facilitate a wide range of practical bar code scanning applications. For example, with the separate unit worn on the user's belt or stored in a pocket, the operator could wear the scan head on a helmet or eye glasses, on an arm band or bracelet, on a ring on one of the operator's fingers, etc. Alternatively, the scan head could be incorporated into a computer tablet pen or other writing instrument, incorporated into a goose-neck scanner for scan-down application, etc.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODES FOR CARRYING OUT THE INVENTION

As used in this specification and in the appended claims, the term "symbol" broadly encompasses not only symbol patterns composed of alternating bars and spaces of various widths as commonly referred to as bar code symbols, but also other one or two dimensional graphic patterns, as well as alphanumeric characters. In general, the term "symbol" may apply to any type of pattern or indicia which may be recognized or identified by scanning a light beam and detecting reflected or scattered light as a representation of variations in light reflectivity at various points of the pattern or indicia. A bar code is one example of a "symbol" which the present invention can scan.

Figure 1:
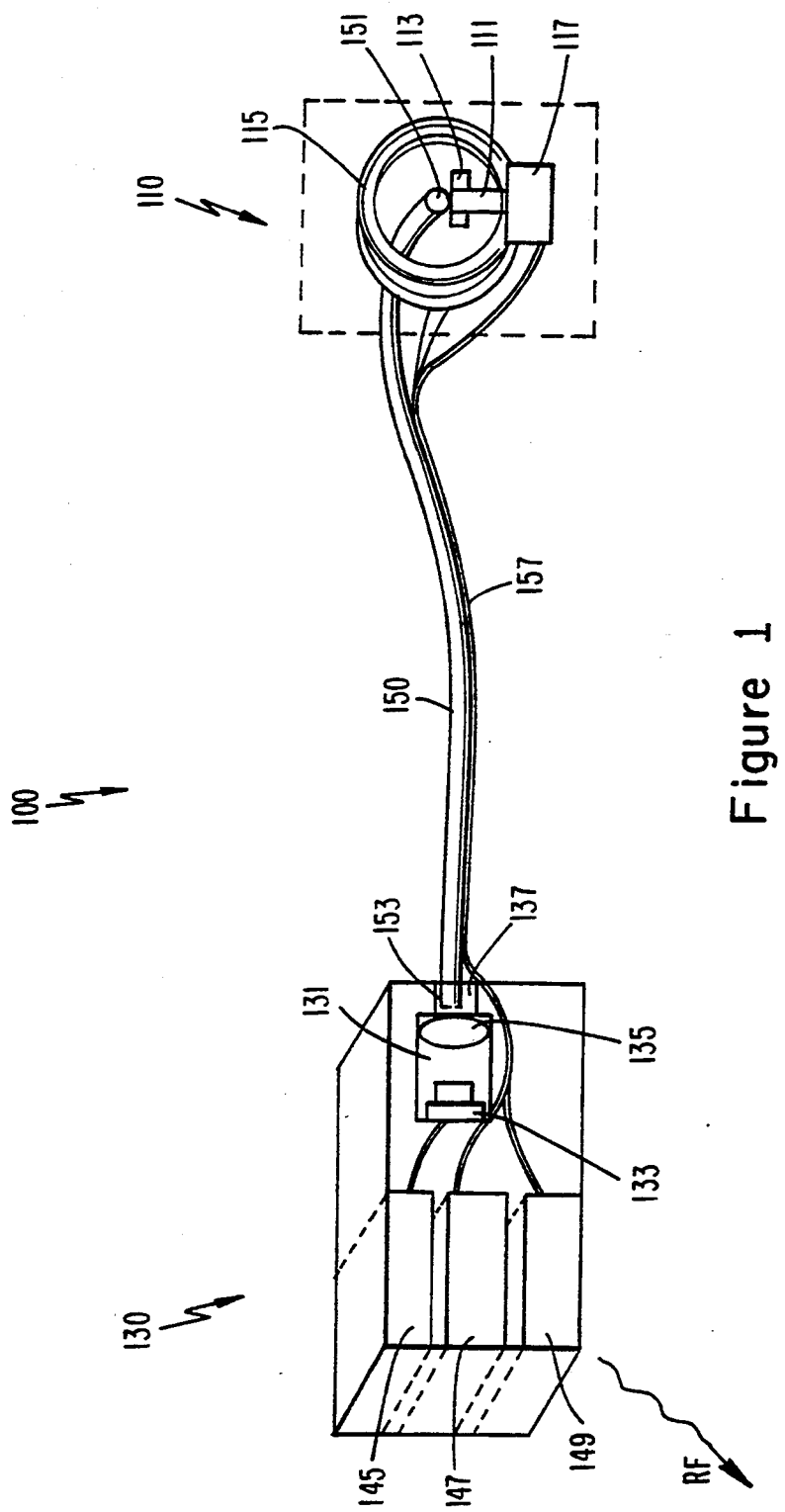
FIGS. 1 to 5 are diagrams showing various embodiments of an optical scanning system using one or more optical fibers, in accord with the present invention.

In the first embodiment of the invention shown in FIG. 1, the scanning system 100 includes a scan head 110 and a separate box or unit 130 connected together by an optical fiber 150. A first end 151 of the fiber is located within the scan head, and a second end 153 of the fiber provides an optical connection to components within the separate housing 130. The scan head and the separate box are also connected by a multi-wire cable 157 bundled together with the fiber 150.

The separate unit 130 contains a light emitter for producing a beam of light for use in scanning optically encoded symbols, and other components which will be discussed later. In the preferred embodiment illustrated in FIG. 1, the light emitter is a visible laser diode (VLD) 133. A lens 135 focuses the beam from laser diode 133, as necessary, to prepare the beam for transmission through the fiber 150. Typically, the diode 133 and the lens are elements of a VLD assembly 131. An assembly of this type will typically include the laser diode, at least one lens element for focusing light from the diode and means to fix the lens element at a desired distance from the laser diode so as to produce a predetermined focal characteristic. Krichever et al., for example in their U.S. Pat. No. 4,923,281, disclose a module having two telescoping holding members and a biasing spring positioned between the laser diode and the lens assembly. One holding member is attached to the laser diode, and the other member holds the lens. The second holder also provides an aperture for the light passing through the lens. During actual focusing, the focusing module assembly is held in a jig which includes key or chuck elements to engage notches or keyways defining the orientation of the laser beam, lens and aperture as the two holding numbers are gradually telescoped together. As soon as the desired focus is achieved, the two holders are permanently fixed relative to one another by using adhesives such as glue or epoxy, or by fastening such as by staking, spot-welding, ultrasonic welding, or the like.

A mechanical/optical coupling device 137 is positioned adjacent the lens 135 and aperture of the VLD assembly 131. The device 137 provides physical support for the second end 150 of the fiber at an appropriate position to receive the beam. The coupling device 137 may also include optical means, such as an additional lens, to provide efficient coupling of the light from the VLD assembly 131 into the transmitting optical fiber 150. The fiber 150 typically is a single mode optical fiber 3-4 feet in length. The fiber is quite flexible and allows considerable movement of the scan head by the operator. The fiber 150 carries the light beam from the coupling device 137 in the separate box 130 to the scan head 110.

The fiber will be permanently connected to the scan head 110. Typically, the scan head will include a housing, illustrated by the dotted line around the components of the scan head in FIG. 1. The fiber 150 will pass through the rear of the housing and may be fixed at that point. In the embodiment of FIG. 1, the first end 151 of the optical fiber 150 is a "free" end in that it is not held in a stationary position, and the second end 153 is a "fixed" end of the fiber 150. A lens or other optical focusing element (not shown) may be formed on or attached to the actual light emitting surface at the first end 151 of the optical fiber for movement therewith.

The first end 151 of the fiber is mounted on a flexible strip 111. The combination of the flexibility of the free end of the fiber with respect to fixed point at the rear of the housing and the flexibility of the strip permit reciprocal motion of the end 151 of the fiber in one direction (horizontal in FIG. 1). The combination of the fiber and flexible support should prevent motion in other directions (e.g. vertical and front to back in FIG. 1). Alternatively, the flexible support structure can include a flexible strip extending across the opening through the coil (see FIG. 3). In the preferred form, the flexible strip(s) comprise Mylar TM or Kapton TM film, but other flexible elements could be used such as a flat strip of non-magnetic metal like a beryllium-copper alloy.

The fiber can be fixed to the scan head housing or some other point relatively far from the flex, and the free first end 151 of the fiber need not extend beyond the flex 111. Alternatively, the fiber could be fixed within the scan head at a point close to the flex, but such an arrangement may produce too much tension on the fiber in the region between the fixed point and the connection to the flex 111.

As shown, the first end 151 of the fiber is attached to the moveable end of the flexible strip 111, and the opposite end of the strip 111 is attached to a fixed support point, for example on the scan head housing or to the coil 115. Twisting of the flexible strip 111 therefore causes the first end 151 of the fiber to rotate laterally. The fiber end is laterally rotated back and forth in response to a motive force. This oscillation of the fiber end during emission of light by the light emitter causes the light emitted from the fiber to scan a surface, such as a surface bearing a bar code or other optically encoded indicia.

In the embodiment of FIG. 1, the coil 115 and permanent magnet 113 produce the necessary motive force. The permanent magnet 113 is glued or otherwise attached to the moveable end of the flexible strip 111, and the first end 151 of the fiber is similarly attached to the magnet 113 and/or to the movable end of strip 111. As shown, the coil 115 is essentially concentric about the rest position of the first end 151 of the fiber. An alternating current signal drives the coil. The magnetic field produced by coil 115 generates a torque on the permanent magnet 113 causing the magnet to oscillate, as described in more detail below. A laser beam from the VLD assembly 131 passes through the fiber 150 and is deflected by the oscillation of the first end 151 of the fiber which is attached to the oscillating permanent magnet. When there is no current through the coil 115, the resilient nature of the fiber and the flexible strip causes the "free" end of the fiber 150 to return to its central rest position, i.e. facing straight forward.

The permanent magnet 113 is aligned so that the axis between its north and south poles is perpendicular to the axis of coil 115. For example, the axis of magnet 113 could be parallel to or within the plane of FIG. 1, and the axis of the coil would be perpendicular to the plane of the Figure. When a current is introduced through the coil 115, interaction between magnetic fields of the coil and the permanent magnet 113 creates a torque causing the magnet 113 (with the attached end 151 of the fiber) to move from an equilibrium position. With the concentric arrangement illustrated in FIG. 1, this interaction of the magnetic field of the coil with that of the permanent magnet creates torque tending to force the axis of magnet 113 in line with the axis of coil 115. This torque causes the flexible strip 111 supporting the free end 151 of the fiber to twist and produce a return force. As a result of such motion, a return force is also produced by the fiber. These return forces are trying to bring the permanent magnet 113 and the end of the fiber back to the rest position. Reversing the polarity of the applied current will reverse the directions of the magnetic force. Therefore, if the current applied to the coil takes the form of a cyclical AC signal, such as a sine wave, a pulse signal, a triangular wave, etc., the induced magnetic forces will produce an oscillatory movement of the permanent magnet 113 and the attached free end 151 of the fiber. The flexible strip(s) twist back and forth causing the end of the fiber to oscillate.

The laser beam emitted from the oscillating free first end 151 of the fiber 150 produces a scan line. If the axis of coil 115 is perpendicular to the plane of the drawing and the axis of the magnet 113 is in the plane of the drawing, the resultant scan line would be horizontal in a plane approximately parallel to the plane of FIG. 1.

In the embodiment of FIG. 1, the scan head 110 includes an optical sensor 117. Typically, sensor 117 is a photodetector, such as a photodiode, positioned to receive light reflected from a symbol scanned by the beam emitted from the first end 151 of the optical fiber. The optical sensor 117 produces an electrical signal having an amplitude proportional to the intensity of the reflected light. Since the intensity of the reflected light varies as a function of the light reflectivity of the scanned symbol, the variations in signal amplitude also corresponds to the information encoded as elements of the symbol of different light reflectivity, such as the bars and spaces of a bar code symbol.

A long flexible multi-wire cable 157 connects the scan head unit 110 with the circuitry within the separate housing 130. The cable carries drive current from the drive signal generator 147 within the separate housing 130 to the coil 115. The cable 157 also carries the electrical signal from the sensor 117 to the processing circuitry 149 within the separate housing 130. The scan head may include an amplifier for increasing the power of the electrical signal from the optical sensor 117 to a level sufficient to permit transmission via the cable to the processing circuitry in the separate housing 130. The flexible cable is approximately the same length as the optical fiber 150 and typically will be joined together with the fiber to form a single cable/fiber bundle connecting the scan head 110 to the separate unit 130.

The processing circuitry 149 within the separate housing 130 includes the amplification stages, digitizer, etc. for processing the electrical signal from sensor 117, and the housing contains the AC drive signal generator 147 which produces the AC signal to drive the coil 115. The separate container 130 also houses the power supply circuitry 145 needed to power the VLD 133 and to provide power for the other circuit elements of the system 100. For example, the electronics in the unit 130 might include the processing circuitry provided by a circuit board for a standard LS-2000 scanner manufactured by Symbol Technologies, Inc. The separate unit 130 is small enough to be carried in a user's pocket, or worn on the user's belt, etc.

Figure 3:
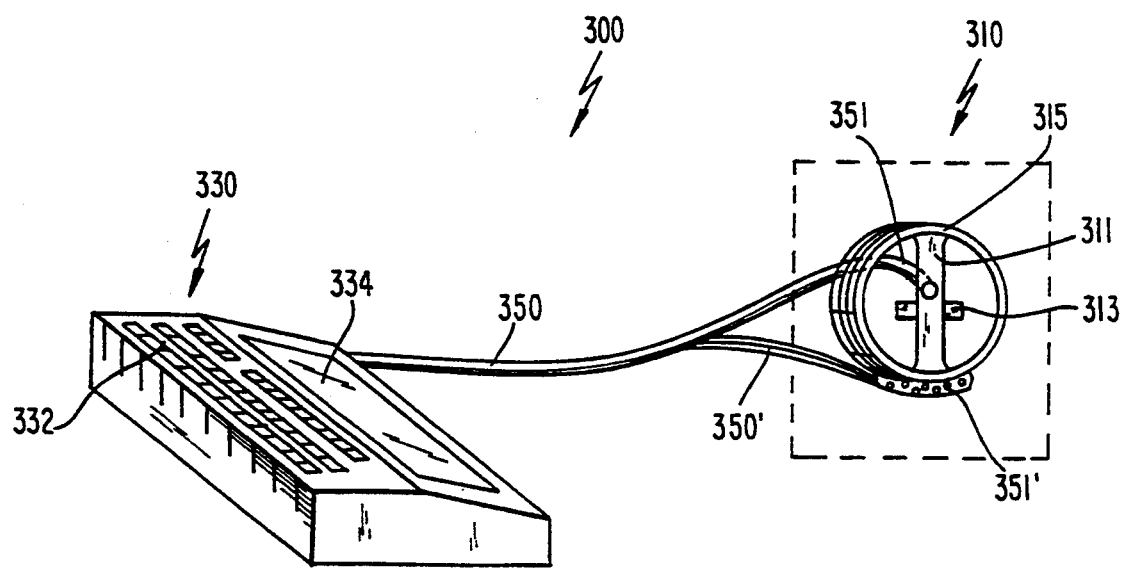

The separate box 130 can further accommodate a complete decoder with the battery power supply (LS85000 type by Symbol Technologies, Inc.) or even a keyboard (like "JADE") and display to make a system not only "hands-free" but "location free" as well (see unit 330 in FIG. 3). Some extra devices can be incorporated in the box 130, for example a memory unit (units), an infrared or RF (radio frequency) transmitter for wireless communication with a remote host computer, or the like. This makes the entire device portable and "motion free," such that during scanning the scanning system 100 need not be connected by any physical means to the cash register, computer, etc. which will ultimately process the scanned bar code data.

Figure 2:
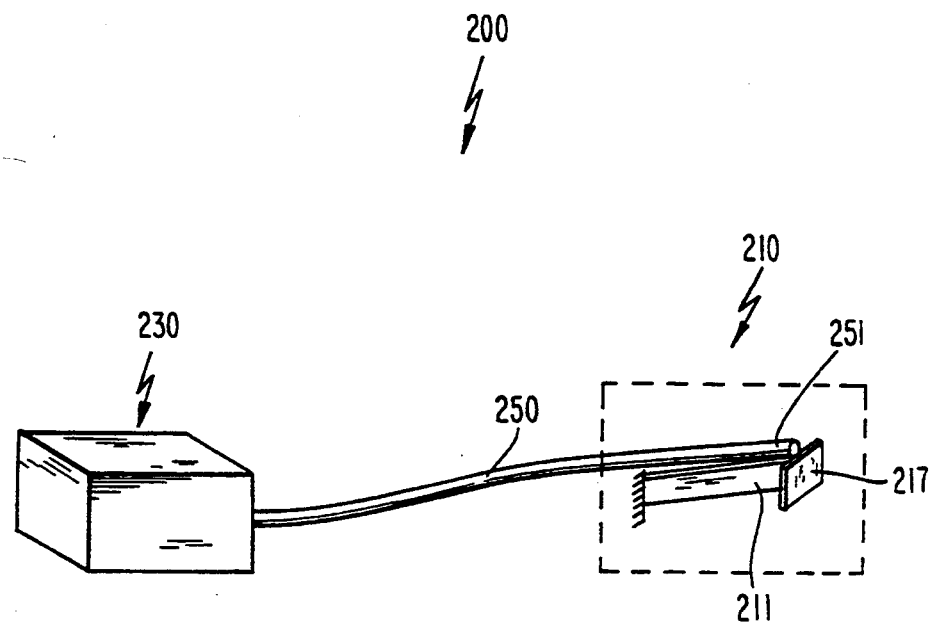

In the second embodiment, shown in FIG. 2, the scanning system 200 includes a scan head 210 and a separate box or unit 230 connected by an optical fiber 250. A first end 251 of the fiber is located within the scan head, and a second end of the fiber provides an optical connection to components in the separate housing 230. The scan head and the separate box are also connected by a multi-wire cable (not shown) bundled together with the fiber 150. The embodiment of FIG. 2 differs from the first embodiment principally in that a piezoelectric element 211 provides flexible support for the free end 251 of the fiber and produces the scanning motion.

Because of the inverse piezoelectric effect, if an electric signal is applied, the piezoelectric material changes physical size, i.e., expands or contracts, depending on the polarity of the applied voltage. The change, however, is very small. The relative change or strain is inversely proportional to the thickness of the piezoelectric material. To produce the effect, hundreds of volts are required but a very low current. The voltage can be DC.

A piezoelectric element includes two (bimorph) or more (multi-morph) piezoelectric layers of opposite polarization bonded together. When one layer shrinks under an applied voltage, the oppositely polarized layer expands. Thus when voltage is applied, the piezoelectric element will bend. If an opposite polarity voltage is applied, the piezoelectric element bends in the opposite direction. Therefore, application of a cyclically alternating voltage causes the piezoelectric element to repeatedly bend back and forth.

In the embodiment of FIG. 2, the free first end 251 of the optical fiber is attached to the moveable end of the piezoelectric element 211. The opposite end of the piezoelectric element 211 is fixed at a point within the housing of the scan head 210. A high voltage, low current AC signal applied to the piezoelectric element 211 causes the element to bend back and forth and the moveable end of the element 211 to reciprocate through an arc defined by the length of the element 211. This reciprocal bending of the element 211 causes the attached free end of the optical fiber to reciprocate. If a lens or other focusing element (not shown) is attached to the light emitting surface of the free end of the fiber, the reciprocation of the piezoelectric element 211 also reciprocates the lens.

The scan head 210 also includes a sensor 217 similar to the sensor in the previous embodiment. The optical sensor 217 produces an electrical signal having an amplitude corresponding to the variations in light reflectivity of the symbol scanned by the beam from the optical fiber 250. Sensor 217 can be fixedly mounted within the housing of the scan head 210, as in the first embodiment. The piezoelectric element 211, however, produces strong reciprocal forces and can actually carry the sensor 217 as well as the free end 251 of the fiber, as shown in the drawing.

A long flexible multi-wire cable (not shown) connects the scan head unit 210 with the circuitry mounted inside the separate container 230. The cable carries drive current from the circuitry within the separate housing 230 to the piezoelectric element 211. The cable also carries the electrical signal from the sensor 217 to the processing circuitry within the separate housing 230. The scan head may include an amplifier for increasing the power of the electrical signal from the optical sensor 217 to a level sufficient to permit transmission via the cable to the processing circuitry in the separate housing 230. The circuitry in the separate container 130 is essentially the same as that inside the box 130 in the first embodiment except that the AC signal generator which produces the drive signal produces a high voltage low current signal appropriate for driving the piezoelectric element 211.

FIG. 3 illustrates a scanning system 300 having a scan head 310 connected to a separate terminal housing device 330 via a bundle of optical fibers 350. A first end of the fibers connects to the scan head 310, and a second end of the fibers connects to the separate housing 330.

The separate box 330 includes the VLD assembly, AC drive signal generator and processing circuitry as discussed above with regard to FIG. 1. In the third embodiment, the separate housing 330 includes the additional components necessary to serve as a data input and display terminal. For example, the terminal 330 can further include a keyboard 332, a display 334 and the associated circuitry for allowing input of data via the keyboard and output of data via the display.

The scan head 310 includes a flexible support structure 311, permanent magnet 313 and coil 315. A free first end 351 of one of the optical fibers from bundle 350 connects to the flex 311. The flexible support structure 311, magnet 313 and coil 315 function essentially the same as the flexible strip, magnet and coil arrangement of FIG. 1. One difference, however, should be noted. The flexible support structure 311 extends entirely across the diameter of the coil 315, with the free end 351 of the fiber attached in the center. The flexible support structure 311 typically is a single flat flexible strip extending across the opening with a hole in the middle to accommodate the free first end of the fiber. The strip forming the flexible support structure 311 comprise Mylar ™ or Kapton ™ film strip(s), etc., as discussed above with regard to flexible member 111.

In the embodiment of FIG. 1, the single flexible strip 111 would need to be rather thick to provide sufficient support to prevent lateral movement or sagging due to the weight of the fiber and the attached permanent magnet. A thick flexible member, however, tends to be stiff and the resultant structure can not operate at low frequencies. In contrast, the structure of flexible support structure 311 shown in FIG. 3 provides increased vertical support and thereby eliminates sagging. Also, although the flexible support structure 311 can twist about a vertical axis, the connection across the opening substantially eliminates bending in either the lateral direction or in a direction from front to back. As a result, the strip or strips used to construct flexible support structure 311 can be relatively thin. Consequently, the flexible support structure 311 is not as stiff and operates quite well at low oscillation frequencies.

The embodiment of FIG. 3 is the first of several preferred embodiments wherein the optical sensor has been moved from the scan head to the separate housing unit. In FIG. 3, the first ends 351' of the other fibers 350' in the bundle 350 are fixed to the coil 315 or some other point in the front of the housing of the scan head 310. These other fibers 350' of the fiber optic bundle serve as return fibers. The return fibers 350' receive light reflected from scanned symbols and transmit that light back to an optical sensor (not shown) located together with and connected directly to the processing circuitry in the separate housing 330. Typically, a coupling member will provide an optical connection from these return fibers 350' to a photodiode, which then produces the signal related to the reflectivity of the scanned symbols in the usual manner. The scan head 310 may also include collective optics, such as one or more lenses, to collect light reflected from scanned symbols and apply that light to the first ends 351' of the return fibers 350'.

The elimination of the optical sensor from the scan head further reduces the size of the scan head and eliminates the weight of the sensor from the scan head. This modification also eliminates the weight of any amplifier which previous embodiments might have needed in the scan head to amplify the sensor signal prior to transmission to the processing circuitry in the separate housing unit. A flexible cable is still required to carry signals between the housing 330 and the scan head 310. This cable however only carries the AC drive current for the coil 315.

Figure 4:
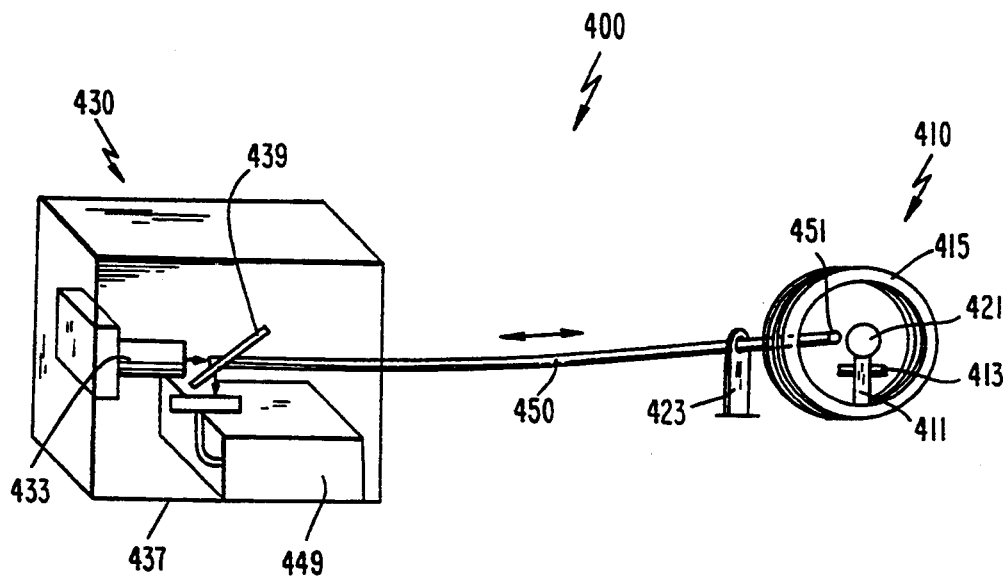

FIG. 4 shows a scanning system 400 which uses a single fiber 450 to carry the laser beam to the scan head 410 and to carry the light reflected from the symbol from the scan head 410 back to the processing circuitry in the separate housing unit 430.

In the embodiment of FIG. 4, a holder 423 within the housing of the scan head 410 fixedly supports the first end 451 of the optical fiber 450 in a stationary position. A lens 421 is located adjacent the end face of the fiber. The lens 421 is mounted on a flexible strip 411. The flexible strip can extend from one side of the coil 415 to the center of the opening within the coil, as shown, or the flexible strip can extend entirely across the opening, as in FIG. 3.

As shown, the lens 421 is attached to the moveable end of the flexible strip 411, and the opposite end of the strip 411 is attached to a fixed support point, for example a point on the scan head housing or the coil 415. The flexible strip 411 supports that lens in front of the first end 451 of the fiber. Twisting of the flexible strip 411 causes the lens 421 to rotate laterally. The permanent magnet 413 is glued or otherwise attached to the objective lens 421 and/or to the moveable end of the flexible strip 411. As shown, the coil 415 is essentially concentric about the rest position of the lens and the first end 451 of the fiber. The permanent magnet 413 is aligned so that the axis between its north and south poles is perpendicular to the axis of coil 415. For example, the axis of magnet 413 could be parallel to the plane of FIG. 4, and the axis of the coil would be perpendicular to the plane of the drawing.

When a current is introduced through the coil 415, interaction between magnetic fields of the coil and the permanent magnet 413 creates a torque causing the magnet 413 (with the attached objective lens 421) to move from an equilibrium position. With the concentric arrangement illustrated in FIG. 4, this interaction of the magnetic field of the coil with that of the cylindrical permanent magnet creates torque tending to force the axis of magnet 413 in line with the axis of coil 415. This torque causes the flex 411 supporting the lens 421 to twist and produce a return force which is trying to bring the permanent magnet 413 and lens back to the rest position. Reversing the polarity of the applied current will reverse the directions of the magnetic force. Therefore, if the current applied to the coil takes the form of a cyclical AC signal, such as a sine wave, a pulse signal, a triangular wave, etc., the induced magnetic forces will produce an oscillatory movement of the permanent magnet 413 and the attached objective lens 421 twisting the flexible strip(s) back and forth. A flexible cable (not shown) is connected between the housing 430 and the scan head 410 and carries the AC drive current for the coil 415.

The laser beam emitted from the first end 451 of the fiber 450 passes through the oscillating objective lens 421, and the oscillatory rotation of the lens produces a scan line. If the axis of coil 415 is perpendicular to the plane of the drawing and the axis of the magnet 413 is in the plane of the drawing, the resultant scan line would be horizontal in a plane approximately parallel to the plane of FIG. 4.

As the beam scans a symbol, the symbol will reflect light back to the scan head 410. The lens 421 also serves a collecting function. Specifically, as the lens oscillates, the lens will collect reflected light and apply that light to the first end 451 of the optical fiber 450. The fiber 450 thus also serves as a return fiber by receiving light reflected from scanned symbols and transmitting that light back to the separate housing 430.

Within the housing 430, the reflected light from fiber 450 is applied to a beam splitter 439. Light from the laser diode 433 is applied to the other side of the beam splitter 439. The beam splitter couples light emitted from the laser diode 433 to the optical fiber 450 for transmission to the scan head 410 and emission through the oscillating lens, as discussed above. The beam splitter 439 also splits out the reflected light from the fiber 450 and applies that light to an optical sensor 437 within the housing 430. Again, the sensor is typically a photodiode which then produces the signal related to the reflectivity of the scanned symbols in the usual manner for analysis by the processing circuitry 449. The other components within the separate housing 430 are essentially the same as in the earlier embodiments.

Figure 5:
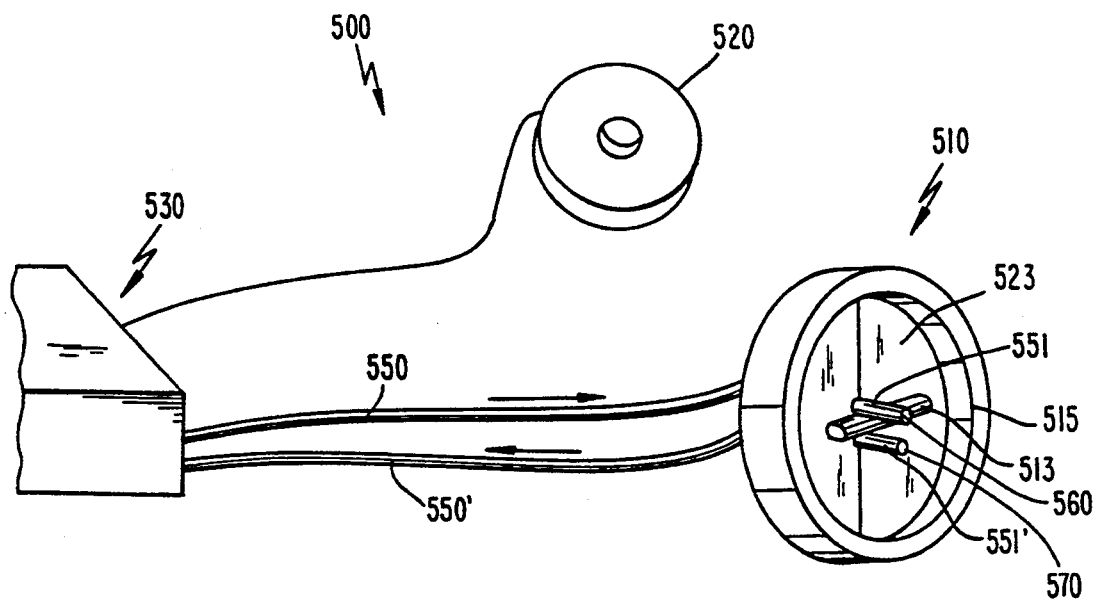

FIG. 5 shows an optical scanning system 500 which uses two optical fibers 550, 550' between the scan head 510 and the separate housing unit 530. The system 500 also relies on the flexibility of the optical fibers to eliminate the need for a flexible support member.

In the embodiment of FIG. 5, the separate housing 530 contains the VLD, the power supply, the drive signal generator, and the processing circuitry, as in the earlier embodiments. The separate unit 530 also contains an optical sensor directly connected to the processing circuitry, as in the embodiments of FIGS. 3 and 4.

In the embodiment of FIG. 5, a base 523 is mounted within the housing of the scan head 510 at a point close to or across the rear opening of the coil 551. The first end 551 of the transmitting fiber 550 and the first end 551' of the return fiber 550' pass through openings in the base 523. The fibers 550 and 550' are fixed within the openings through the base 523, but the ends 551 and 551' of the fibers extend sufficiently past the base to be flexible. The ends 551 and 551' of the fibers are aligned one above the other with a permanent magnet 513 attached in between them.

Scanning members need rigidity in all directions except for the direction in which the member is to reciprocate to produce the desired scanning motion. If the scanning support structure is not sufficiently rigid in the non-scanning directions, fringe magnetic fields will cause undesired movement in other directions, disrupting the scan pattern. Hence the embodiment of FIG. 1 used a thick flexible support, and the embodiment of FIG. 3 used a flex system which extended entirely across the opening through the coil structure. In the embodiment of FIG. 5, the vertical alignment of the fiber ends 551 and 551' and attachment to each other through the magnet produces a "flat" pair configuration which exhibits considerable rigidity in the vertical direction. Such a structure will prevent sagging of the fiber ends, without requiring any vertical support structure.

A flexible cable connected between the housing 530 and the scan head 510 carries the AC drive current for the coil 515. As shown, the coil 515 is essentially concentric about the rest position of the first end 551 of the transmitting fiber 550. The permanent magnet 513 is aligned so that the axis between its north and south poles is perpendicular to the axis of coil 515. When a current is introduced through the coil 515, interaction between magnetic fields of the coil and the permanent magnet 513 creates a force causing the magnet 513 (with the attached ends of the fiber) to move from an equilibrium position. With the concentric arrangement illustrated in FIG. 5, this interaction of the magnetic field of the coil with that of the cylindrical permanent magnet creates torque tending to force the axis of magnet 513 in line with the axis of coil 515. This torque causes the first ends 551 and 551' to bend and produce a return force which is trying to bring the permanent magnet 513 and fiber ends back to the rest position. Reversing the polarity of the applied current will reverse the directions of the magnetic force. Thus, application of the cyclical AC drive signal to the coil 515 produces magnetic forces which will cause reciprocation of the permanent magnet 513 and the attached fiber ends 551, 551'. As light from the VLD passes through the transmission fiber 550, the laser beam emitted from the reciprocating first end 551 of the fiber 550 produces a scan line.

As the beam scans a symbol, the symbol will reflect light back to the scan head 510. As the end 551' of the return fiber 550' reciprocates, the end 551' will collect the reflected light. The fiber 550' thus receives the light reflected from scanned symbols and transmits that light back to the separate housing 530. Within the housing 530, the reflected light from the return fiber 550' is applied to the optical sensor (not shown) located with and connected to the processing circuitry in the separate housing 530. The optical sensor produces the signal related to the reflectivity of the scanned symbols which is processed in the usual manner.

A lens 560 may be formed on or attached to the actual light emitting surface at the first end 551 of the transmitting optical fiber 550, to provide focusing of the scanning beam at an appropriate range from the scan head 310. Similarly, a lens 570 may be formed on or attached to the actual light receiving surface at the first end 551' of the return fiber 550', to collect light reflected from the scanned symbols.

The scanning systems of the present invention typically include a manually activated trigger switch 520. The trigger activates the power supply, the light emitter, the drive signal generator, the processing circuitry, etc. to activate beam generation, scanning and reflected light detection. Use of the trigger conserves power by powering down the system components when not actually used for scanning.

Figure 6A:
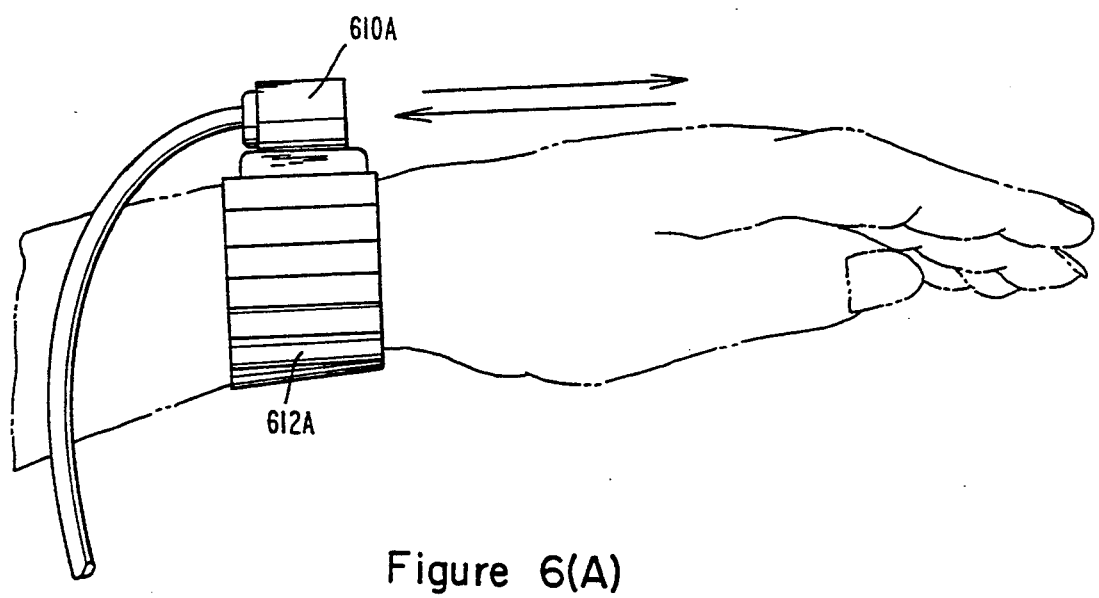
FIGS. 6A to 6D show various arrangements for mounting the scan head.
Figure 6B:
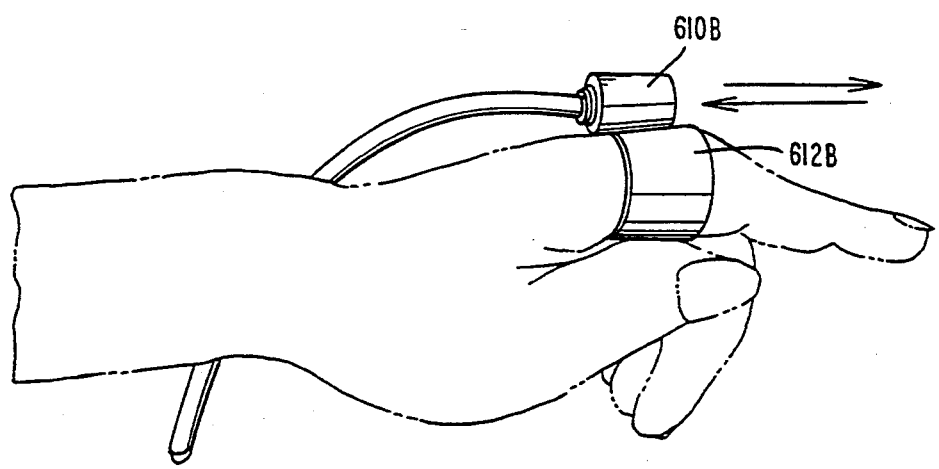

The scanning systems of the present invention would be operated by aiming the scan head at a symbol and activating the trigger, in a manner Similar to the operation of the prior art device of FIG. 1. Because of the small size, light weight and insensitivity to temperature of the scan head, however, any of the scan heads of the present invention can be mounted, worn or held by an operator in a wide range of positions. For example, with the separate unit worn on the user's belt or stored in a pocket, the operator could wear the scan head on a helmet or eye glasses, etc. FIG. 6(A) shows mounting of a scan head 610A on an arm band or bracelet 612A, to permit the operator to wear the scan head in a manner similar to a wrist watch. FIG. 6(B) shows mounting of a scan head 610B on a ring 612B worn on one of the operator's fingers. The position can be selected to maximize comfort and convenience for the operator in view of the various functions the operator performs. The trigger switch also can be located at whatever point is most convenient, for example on the scan head, on the separate unit or at some other desirable point where it is easy to operate.

Further examples of the variety of types of systems which can use the present scanning system include pens and gooseneck scanners, as discussed below.

Figure 6C:
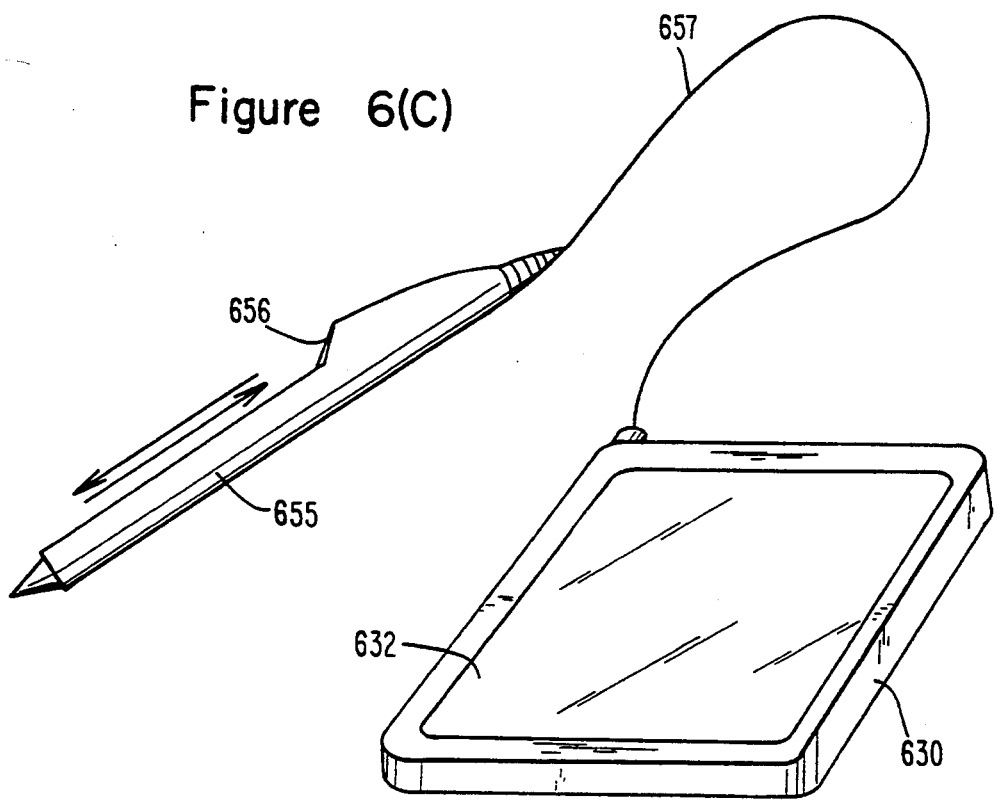

FIG. 6(C) shows an electronic tablet type computer input system wherein the writing stylus or pen includes a scan head in accord with the present invention. In the illustrated embodiment, the tip end of the pen would include the necessary stylus electronics, and the scan head would be mounted in the enlarged rear section of the stylus housing 655. A light-transmissive window 656 in the housing 655 allows the outgoing light beam from the scan head to exit and the incoming reflected light to enter. Other configurations of the stylus housing 655 are possible, for example the housing could be arranged to mount the scan head at a point on or near the tip and include an extensible writing instrument and/or extensible electronic stylus tip components.

The stylus, including the scan head, connects to the separate box 630 via a cable 657 which includes a multi-wire cable bundled together with the optical fiber(s). The separate box 630 is similar to the separate boxes in the embodiments of FIGS. 1 to 5, but box 630 also incorporates a writing tablet 632. The writing tablet is sensitive to contact or pointing of the stylus tip at positions on the tablet to derive positional data, and the tablet displays information related to the derived positional data. For example, the tablet may include an resistive contact type input screen, for electronically determining an X,Y position at which the pen tip contacts the tablet surface, and an associated display device, such as those disclosed in U.S. Pat. No. 4,972,496. Alternatively, the stylus electronics could rely on a light pen technology, on capacitive contact detection circuitry, pressure sensitive contact detection circuitry, ultrasonic proximity detection circuitry, etc. In each case, the key feature is that the stylus incorporates both the electronics necessary to provide X,Y position data input to the corresponding type of electronic tablet 632 and the scan head of the present invention.

Figure 6D:
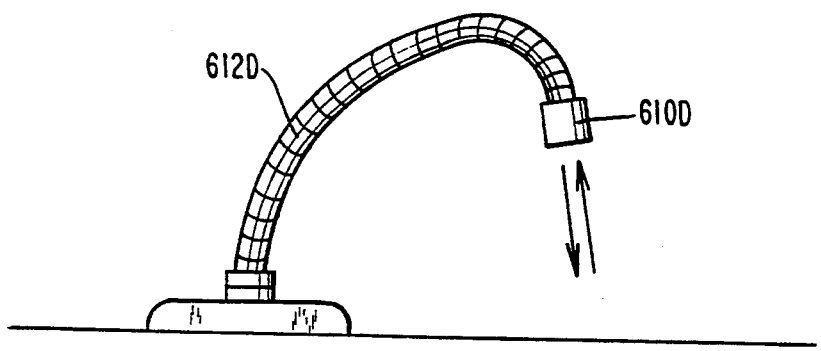
Figure 7:
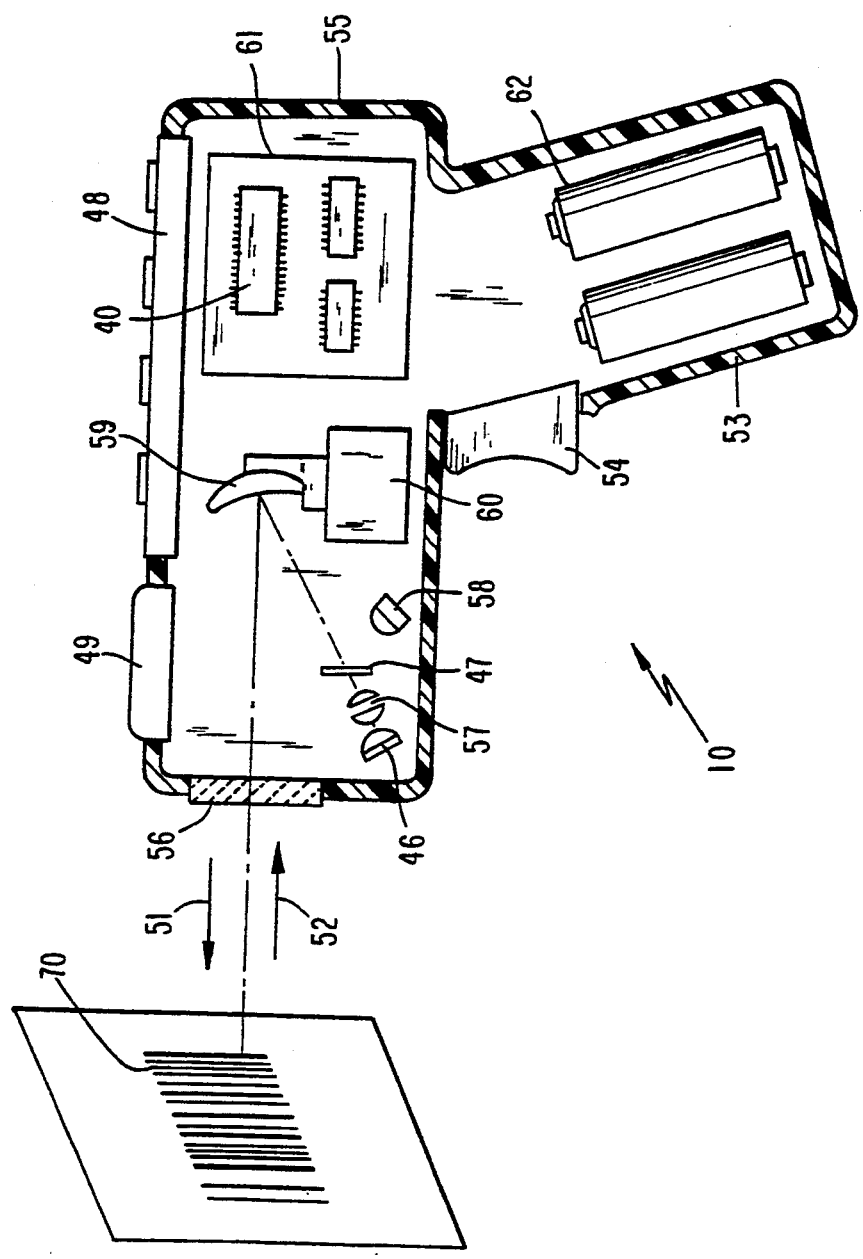
FIG. 7 illustrates a prior art handheld laser scanner and terminal device for scanning bar codes and inputting and displaying data.

FIG. 6(D) shows use of the present invention in a gooseneck type scanner. In this embodiment a scan head 610A in accord with the present invention is mounted on the end of a flexible support arm 612D, which is similar in structure to the flexible support used in many types of desk lamp. The operator adjusts the curvature of the flexible support arm 612D to point the light emitting end of the scan head 610D down toward a point across which bar code labeled objects will pass. Typically, the optical fiber and the flexible multi-wire cable enter through the base of the support arm, pass through the flexible support arm 612D and connect to the scan head 610D in the manner described above with regard to FIGS. 1 to 5. One advantage to this embodiment is that the gooseneck scanner can be placed in relatively hostile environments, e.g. high temperature locations, and once set in position the operator need not physically manipulate the scan head during each scan operation performed in such an environment.

From the above detailed description of the presently preferred embodiments, it should be clear that the invention reduces the size and weight of the scan head unit by moving as many components as possible to a separate housing unit. One or more optical fibers carry light from the laser diode to the scan head unit. The scan head, because it no longer contains the temperature sensitive laser diode, can also operate in more hostile environments. In some embodiments, the invention also moves the detector to the separate box and uses an optical fiber to carry light reflected by scanned symbols from the scan head back to the detector in the separate housing unit. The different systems for producing the scanning motion of the beam further facilitate reductions in size and weight. The invention thus produces a scanning system which is convenient to carry and operate and is particularly robust.

What is claimed is:

1. A system for reading coded indicia, comprising:
   an optical scan unit;
   a separate unit spaced apart from the optical scan unit, the separate unit containing a light emitter, an optical detector and circuitry for analyzing signals from the optical detector;
   at least one optical fiber carrying light from the emitter to the optical scan unit, receiving light reflected from scanned optically encoded indicia and carrying the reflected light from the scan unit back to the optical detector; and
   means, within the scan unit, for producing oscillatory movement of light carried from the emitter and emerging from said at least one optical fiber for scanning the optically encoded indicia, and wherein said means for producing oscillatory movement includes an element to which said at least one optical fiber is directly attached, the element being of a single material that is attracted or repelled with respect to an applied magnetic field, and means for producing an electromagnetic field for interacting with said element.

2. A system as in claim 1, wherein said means for producing oscillatory movement comprises means for producing an oscillatory motion of a moveable first end of said at least one optical fiber within said optical scan unit, wherein a second end of said at least one optical fiber connects to said separate unit.

3. A system as in claim 1, wherein said at least one optical fiber comprises a first fiber carrying the light from the emitter to the optical scan unit, and a second fiber carrying the light reflected from the optically encoded indicia from the optical scan unit back to the optical detector.

4. A system as in claim 3, further comprising a base within the optical scan unit, wherein the first and second fibers are mounted in the base and each have a free end extending a distance beyond the base such that the free ends of the fibers are flexible, said free ends of the first and second fibers being attached to the element.

5. A system as in claim 4, wherein said means for producing oscillatory movement comprises:
   a coil fixedly mounted within said optical scan unit; and
   wherein the element comprises a magnet fixed with respect to the free ends of the first and second fibers such that when an oscillating drive current is applied to said coil the coil generates a magnetic field which produces a reciprocating force on said magnet and the free ends of the first and second fibers.

6. A system as in claim 1, further comprising means for mounting the scan unit on an arm, wrist or finger of a user.

7. A system as in claim 1, further comprising a pen or stylus type housing containing the scan unit.

8. A system as in claim 1, wherein the scan unit is incorporated into a gooseneck scanner for scan down applications.

9. A system as in claim 1, wherein said element is a permanent magnet.

10. A system as in claim 9, wherein said magnet is cylindrical in shape.

11. A system as in claim 1, further comprising an activating means to activate said system.

12. A system as in claim 11, wherein said activation means is located in a housing which does not house said optical scan unit or said separate unit.

13. A system as in claim 2, further comprising a lens formed on or attached to said moveable first end of the at least one optical fiber.

14. A system as in claim 4, wherein said element is a magnet and is located between the free end of said first fiber and the free end of said second fiber.

15. A system as in claim 14, wherein said free ends of the first and second fibers are aligned in a direction perpendicular to a north-south axis of the magnet and the north-south axis of the magnet is perpendicular to the axis of the coil.

16. A system as in claim 15, wherein said oscillatory movement occurs only about an axis parallel to said direction of alignment.

17. A system as in claim 15, wherein said free ends of the first and second fibers are taut in the direction of alignment.

18. A system as in claim 5, wherein said base is mounted across an opening of said coil.

19. A system as in claim 5, wherein said coil and said free ends of the first and second fibers are in concentric alignment.

20. A system as in claim 5, wherein said free ends of the first and second fibers effect a counter force to the reciprocating force which is less than the reciprocating force.

* * * * *